United States Patent
Mauro

(10) Patent No.: US 6,267,021 B1
(45) Date of Patent: Jul. 31, 2001

(54) ANTI-BACKLASH DEVICE FOR A MOTORIZED OPTICAL COMPONENT POSITIONING STAGE

(76) Inventor: George Mauro, 28 Keewaydin Dr. Suite B, Salem, NH (US) 03079

(*) Notice: Subject to any disclaimer, the term of this patent is extended or adjusted under 35 U.S.C. 154(b) by 0 days.

(21) Appl. No.: 09/452,245

(22) Filed: Dec. 1, 1999

(51) Int. Cl.[7] ..................................................... F16H 55/18
(52) U.S. Cl. ........................... 74/89.42; 74/441; 359/391
(58) Field of Search ..................... 74/441, 459, 89.42; 411/198, 202, 203, 233, 247, 277, 301, 324, 333; 359/391

(56) References Cited

U.S. PATENT DOCUMENTS

| | | | |
|---|---|---|---|
| 2,090,337 | * 8/1937 | Stoll | 411/324 |
| 4,002,083 | * 1/1977 | Glicken | 74/459 |
| 4,210,033 | * 7/1980 | Erikson et al. | 74/441 |
| 4,593,572 | * 6/1986 | Linley, Jr. | 74/441 |
| 4,652,095 | 3/1987 | Mauro . | |
| 5,077,620 | 12/1991 | Mauro . | |

* cited by examiner

Primary Examiner—Maryann Green
Assistant Examiner—William C Joyce
(74) Attorney, Agent, or Firm—Davis & Bujold, P.L.L.C.

(57) ABSTRACT

An anti-backlash device for a positioning stage arranged for the precise movement of components composed of a pair of plates having rail receiving grooves, a pair of rails joining the plates and attached thereto and a work piece mounting table, the anti-backlash device, having a plurality of circumferentially spaced elongate spring members for biasing an interrupted thread into zero clearance engagement with a threaded rod rotatable to move the table along the rails.

9 Claims, 2 Drawing Sheets

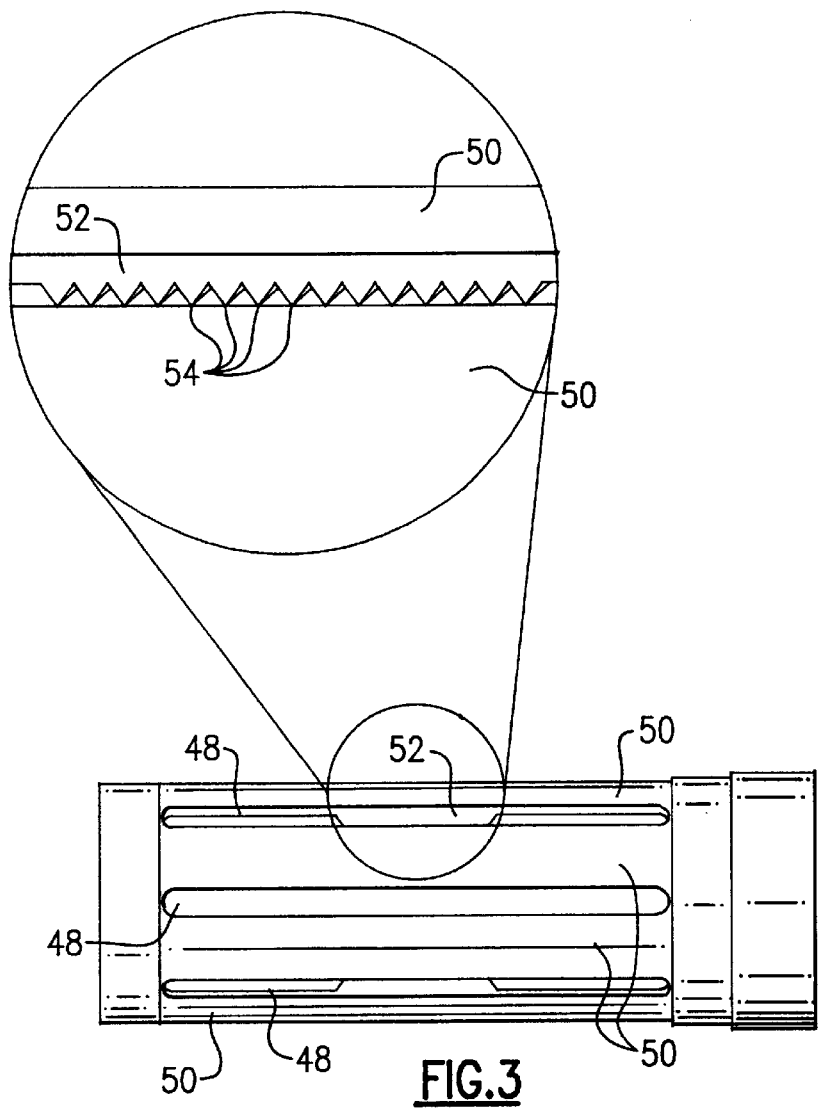
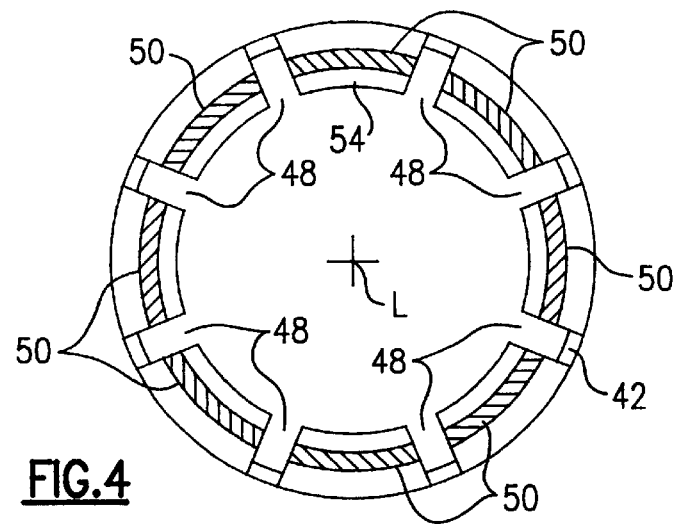

ANTI-BACKLASH DEVICE FOR A MOTORIZED OPTICAL COMPONENT POSITIONING STAGE

BACKGROUND OF THE INVENTION

1. Field of the Invention

The invention resides in the field of adjustable work piece mounting devices for optical components and more particularly relates to motor driven precise positioning stages having anti-backlash components.

2. Description of the Prior Art

A precision positioning stage of the type relating to the invention is disclosed in U.S. Pat. Nos. 4,652,095 and 5,077,620 issued to the applicant. The device described therein employs an adhesive assembly concept for a stage utilizing two end plates having grooves for receiving a pair of rails and a work table slideably disposed between the plates.

The U.S. Pat. No. 5,077,620 is an improvement over U.S. Pat. No. 4,652,095 in that it provides an electrical motor, gear system, and encoder mounted on an additional plate also disposed between the rails and wherein the motor is operationally connected to the work table by, for example, a threaded rod working in conjunction with an anti-backlash device having engaging threads such that the table is precisely moved by actuation of the motor.

Although the device of U.S. Pat. No. 5,077,620 is capable of quite accurate control of the positioning, stability and movement of the work table, any imperfection of the threaded interconnection of the work table and the table drive mechanism, particularly deviations in thread diameters, clearance, alignment, etc. and undesired clearance between the male and female threads will detract from that accurate control. Modern miniature components and parts often require tolerances which are difficult or impossible to meet with constructions such as that of U.S. Pat. No. 5,077,620.

Backlash is an inevitable byproduct of imperfect fabrication techniques and allowable tolerances. It is the amount by which the space between threads exceeds the width of the engaging threads and generally tends to substantially effect the engaging threads and associated components upon reversal of gear rotation. As is appreciated by those of ordinary skill in the art, any reduction in backlash between threads, especially in the art of micro adjustable tools, amounts to a considerable increase in the precision with which associated components of the apparatus may be positioned.

Precise measurement to achieve the above described positioning entails paying particular attention to the alignment and precision of the engaging and moving parts, in particular between engaging threads. Elimination of backlash between threads is of considerable importance in the reduction of error in precise positioning.

Accordingly, it is an object of the present invention to overcome many or all of the thread related limitations of the prior art.

SUMMARY OF THE INVENTION

The invention may be summarized as an improvement in a work piece positioning stage of the type described above to provide a degree of precision and miniaturization not heretofore obtainable in that the travel of the work piece table is precisely performed and duplicated via the particularly accurate engagement between the threaded rod and an anti-backlash device attached to the table.

According to the invention there is provided an anti-backlash device defining a longitudinal axis and comprising at least three elongate spring members spaced apart about said axis and supported at opposed ends by first and second longitudinally spaced member supports, each spring member being fast with a threaded portion, the threaded portions being spaced apart about said axis to form an interrupted thread biased by the spring members for zero clearance engagement with a mating thread.

Also according to the invention there is provided in an optical positioning stage having a workpiece mounting table slideably disposed on rails, a motor assembly drivingly connected to a threaded rod wherein rotation of said motor affects lateral movement of said table along the rails; an anti-backlash device comprising, a tubular member having a first end and a second end separated by a plurality of resilient bridges, extending between said first and second ends, separated by a like plurality of slots also extending between said first and second ends, the first and second ends having an outer diameter to facilitate a press fit engagement within a bore in said table and the resilient bridges having an incurvate compressive bias providing a variable diameter decreasing to a central portion of the tubular member; the bridges together define, on an inner surface thereof, an interrupted female thread, for a biased, resilient engagement with the threaded rod to effectuate a resiliently biased substantially zero clearance engagement of the female thread with the thread of the rod.

BRIEF DESCRIPTION OF THE DRAWINGS

The advantages and features of the invention will be more fully understood from the description of the preferred embodiment and drawings, given by way of example, in which:

FIG. 3 is a plan view, including an exploded partial view of the anti-backlash device and the central engaging threaded portion thereof; and FIG. 4 is a sectional elevation taken normal to the axis of the anti-backlash device in the central threaded portion thereof.

DESCRIPTION OF THE PREFERRED EMBODIMENT

Figure 1:
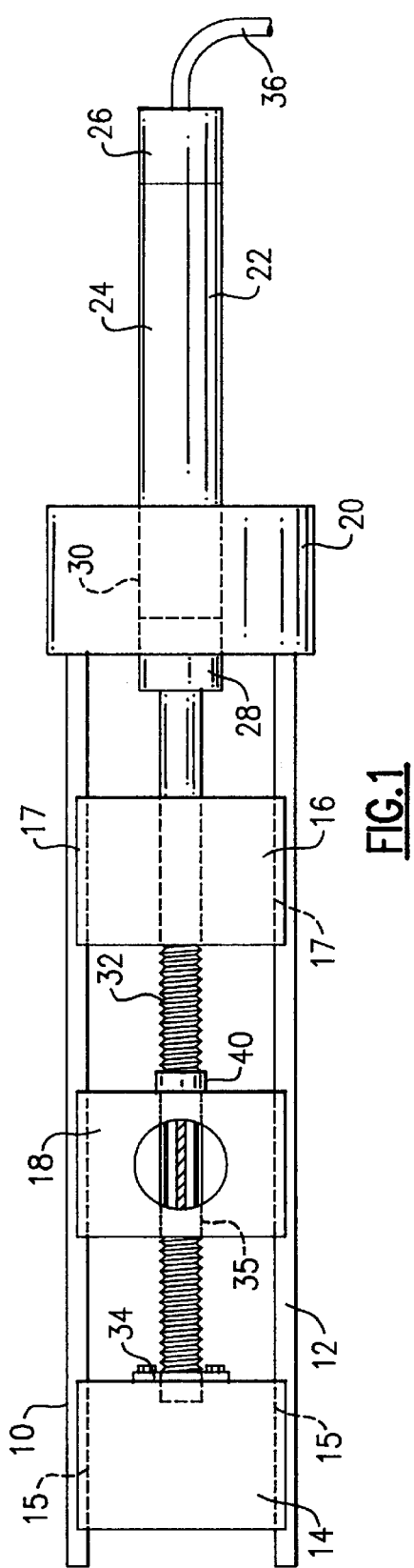
FIG. 1 is a plan view of a positioning stage incorporating a preferred embodiment of a anti-backlash device of the invention.

Referring first to FIG. 1, a stage comprising the preferred embodiment is illustrated in which rails 10 and 12 are spaced apart by, and fixedly attached to end plates 14 and 16 in grooves 15 and 17 respectively. Work piece mounting table 18 is slideably disposed between rails 10 and 12. A fixed motor assembly mounting plate 20 is attached between rails 10 and 12 on the opposite side of end plate 16 from mounting table 18.

Motor assembly 22 consisting of electric motor 24, motor revolution sensing encoder 26 and speed reducing gear train 28 is mounted through plate 20 in bore 30 and is secured therein.

Threaded rod 32 driven by motor assembly 22 passes through plate 16 and is rotationally engaged with work piece table 18 by an inner threaded bore of an anti-backlash device 40 non-rotatably mounted in bore 35, the threaded rod then being rotationally attached to end plate 14 via a split ring clamp 34 or other means as would be obvious to those skilled in the art.

As will be understood by those skilled in the art, and described in further detail below, rotation of the motor in this embodiment moves table 18 between end plates 14 and 16 using the same combination of gear train 28, motor 24, encoder 26 and cable 36 described above.

Cable 36 connects assembly 22 to electrical power and control circuitry wherein the output of the encoder is translated into the distance traveled by table 18. Actual measurements depend upon the physical parameters of the system constructed in accordance with the invention. Motor assembly units and control components of the type suitable for employment in the invention are available from for example Micro Mo Electronics Inc., St. Petersburg, Fla. 33701.

Table 18 includes a bore 35 therethrough sized to firmly engage the anti-backlash device 40 which, in turn, engages the threaded rod 32. The bore 35 is located substantially centrally in the table 18 and is formed parallel with respect to the rails 10 and 12. The bore 35 is sized to accept, with an interference fit, the anti-backlash device 40 which is designed to eliminate backlash otherwise associated with the threaded engagement of the rod 32 with the table 18 by way of the device 40.

Figure 2:
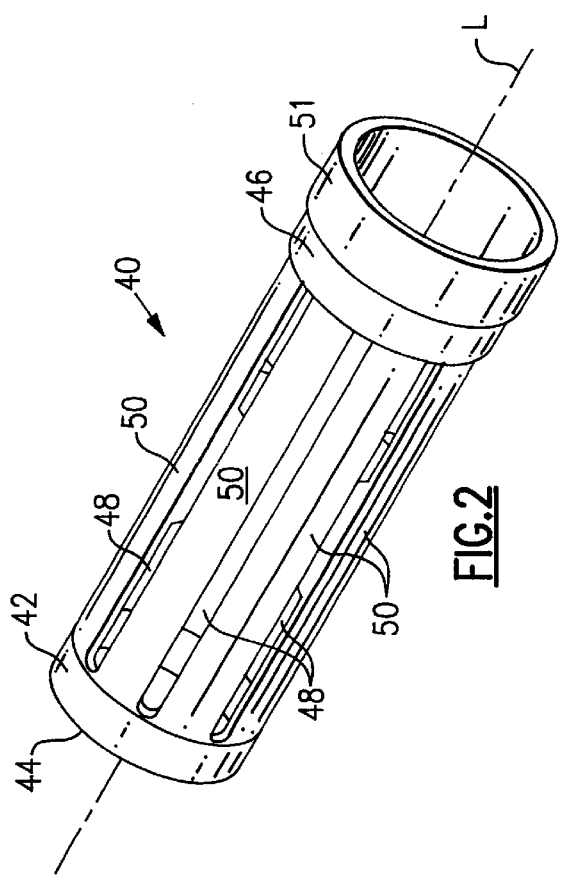
FIG. 2 is a perspective view of the anti-backlash device of the present invention.

Turning now to FIG. 2, the anti-backlash device 40 consists of a substantially tubular one piece member 42 defining a longitudinal axis L. The tubular member 42 includes spaced apart first and second end ring (spring member supports) 44, 46 each defining an outer diameter sized to facilitate a press fit engagement within and along at least a portion of the bore 35.

A series of evenly spaced parallel longitudinally extending elongate slots 48 are cut along the length of the tubular member 42 and extend from the first to the second end ring. The slots 48 pass radially completely through the tubular member 42 and create an evenly spaced plurality of longitudinal elongate spring members (bridges) 50 spanning substantially the length between the first and second end rings 44, 46. In addition, the outer diameter of the spring member 50 may define a diameter which is less than the press fit outer diameter of the end rings 44, 46.

Turning now to FIGS. 3 and 4, each of the spring members 50 includes a substantially centrally located inner threaded portion or region 52 the portions together defining an interrupted thread 54 to matingly engage with the threaded rod 44. The slots are fabricated by a wirecut EDM process. The backlash device is formed of beryllium copper.

The length of the anti-backlash device is about the length of the mounting table 18, about 0.54 across its two end rings and the slots are cut along the tubular member to a length of about 0.44 inch. There are, in a preferred embodiment, eight elongate slots, although as is known to anyone skilled in the art, any number of slots 48 to create a desired resilience in the spring members could be cut. However, a minimum of three slots 48 is required for proper functioning. The central threaded portion of the spring members 50 is approximately one third of the length of the slots.

One of the first or second end rings has an abutment ring 51, having a larger diameter than the outer diameters of the end rings 44, 46 of the tubular member 42, in order that the abutment ring abuts an end of the mounting table 18 to locate the anti-backlash device relative to the mounting table 18 in bore 35.

The spring members 50 are imparted with a desired incurvate compression about the circumference of the tubular member thus reducing the diameter of the backlash device towards its center. The spring members 50 are heat treated and squeezed radially inwardly, by methods well known to those skilled in the art, approximate their center portions, in order to provide an inward compressive force which is substantially centered on the spring members 50 and therefore on the inner threaded portions 52 and interrupted thread 54. This inward compressive force is imparted to the inner threaded portions 52 of the anti-backlash device and creates a particularly desirable compressive force and the slight hourglass shape of the entire anti-backlash device. Such forces and shape provide zero clearance, between the thread of the anti-backlash device and the mateably engaging thread of the threaded rod 44.

Such an inward 360 degree compressive feature forces this zero clearance whereby the space between the threads is substantially eliminated thus backlash is effectively eliminated. The resilient spring members also follow any deviation in diameter or misalignment between the interrupted thread of the device and threaded rod such that movement of the table 18 is unaffected by these. Thus linearity of movement and accurate positioning of the workpiece as well as repeatability of any particular position is greatly enhanced.

The inner compressive force generated by the spring members 50 is not substantial in that although there is imparted to the interrupted thread enough force to eliminate backlash, there is still only a minimal amount of longitudinal force between the engaged threads needed to cause a slippage between the interrupted thread 54 and the thread of the rod 44. A longitudinal force of approximately 1 lb in the longitudinal direction between the rod and anti-backlash device will cause the inwardly compressed bridges to flex outwardly causing the engaging threads of the bridges and rod 44 to slip longitudinally past one another with a device here described by way of example. This arrangement serves to minimize friction while providing the desired function of the device.

What is claimed is:

1. An anti-backlash device in combination with a positioning stage having a workpiece mounting table slideably disposed on rails, a motor assembly drivingly connected to a threaded rod wherein rotation of said motor affects lateral movement of said table along the rails;

the anti-backlash device comprising,
   a tubular member having a first end and a second end separated by a plurality of resilient bridges, extending between said first and second ends, separated by a like plurality of slots also extending between said first and second ends,
   the first and second ends having an outer diameter to facilitate a press fit engagement within a bore in said table and the resilient bridges having an incurvate compressive bias providing a variable diameter decreasing to a central portion of the tubular member;
   the bridges together define, on an inner surface thereof, an interrupted female thread, for a biased, resilient engagement with the threaded rod to effectuate a resiliently biased substantially zero clearance engagement of the female thread with the thread of the rod;
   the bridges together define, on an inner surface thereof, an interrupted female thread, for a biased, resilient engagement with the threaded rod to effectuate a resiliently biased substantially zero clearance engagement of the female thread with the thread of the rod;
   the female thread of the bridges being located only on a substantially central portion of the bridge.

2. The combination of claim 1, the device comprising, on one of the first and second ends, a raised circumferential lip portion to facilitate abutment of the device with an opening of the bore in the table.

3. The combination of claim 1, the incurvate compressive bias of the bridges being such that upon engagement between the female thread of the bridges and the threaded rod, a longitudinal force of approximately one pound results in outward displacement of the resilient bridges causing engaging adjacent threads of the bridges and rod to ride over one another.

4. The combination of claim 1, the tubular member being machined from a single piece of beryllium copper.

5. The combination of claim 1, there being eight elongate slots and eight corresponding bridges.

6. The device of claim 5, wherein the length of the device from the outer longitudinal extension of the first and second ends is about 0.54 inch, the outer diameter of the first and second ends is about 0.165 inch and the leaf springs are each about 0.44 inch long.

7. The combination of claim 1 the bridges of the anti-backlash device being squeezed inwardly and heat treated to provide the resilient incurvate bias.

8. The combination of claim 1, wherein the resilient bridges are identical leaf springs extending between the first and second ends and spaced apart circumferentially by identical said slots which extend the length of the leaf springs.

9. The combination of claim 1, wherein the first and second ends define aligned openings having an inside diameter to provide a clearance from the threaded rod.

* * * * *